United States Patent Office 2,934,457
Patented Apr. 26, 1960

2,934,457
PROCESS FOR TREATING POLYETHYLENE FILM

John C. Elliott, Madison, Wis., assignor to Bjorksten Research Laboratories, Inc., a corporation of Illinois No Drawing. Continuation of abandoned application Serial No. 190,053, October 13, 1950. This application April 22, 1953, Serial No. 350,505

3 Claims. (Cl. 117—118)

This invention pertains to film of polymerized hydrocarbons, and particularly to a method for removing the "waxy" surface feel of polyethylene and its analogues.

This application is a continuing application of application Serial No. 190,053, filed October 13, 1950, now abandoned.

The polyethylene films have gained considerable acceptance because of their relatively low cost, high tenacity, resiliency, resistance to water and other desirable film properties. They have met with considerable sales resistance however, because of a waxy or greasy surface "feel," which is disagreeable to many persons.

An object of this invention is to overcome this greasy surface characteristic, and to provide polyethylene films which have substantially the same non-greasy "feel," as for example the vinyl films, without loss of any of their desirable properties.

Further objects will become apparent as the present detailed description proceeds.

In accordance with my invention, I expose the polyethylene film to be treated to the action of chlorine under oxidizing conditions. For example, passing the film through a bath of aqua regia is suitable, although other treatments exposing the film to the oxidative influence of nitrosyl chloride, or of a chlorine oxide, are also suitable.

For practical reasons I prefer to apply the treatment in a liquid bath, under conditions providing for ample ventilation, though a vapor treatment is also possible.

The invention is further illustrated by the following specific examples, which are given to illustrate the invention only, and are not to be construed in any sense of limitation.

Example 1

I pass a polyethylene film through a bath containing 20%–40% of fuming nitric acid and 60%–80% of 38% commercial hydrochloric acid at a rate of speed which leaves the film in contact with the said bath for 60 seconds, the bath having a temperature of 65° C. As the film leaves the bath, it is impinged upon with air currents from air jets on both sides, the apertures of the jets having a diameter of approximately 0.01 inch and the air pressure being approximately 40 pounds per square inch. These air jets blow any adherent drops of acid away from the film and back into the acid bath. The film is then passed through a water spray and then through ammonium hydroxide to neutralize the acid, and is then dried either by blowing off the remaining adherent water drops with air jets, or by festooning, or by an air tunnel, or in any other of the many ways well known to the art.

The film, after this treatment, has lost its waxy or greasy feel.

Example 2

I pass a polyethylene film through a vapor space filled with vapors of nitrosyl chloride, at a temperature of 60° C., the time of contact being 2 minutes. The film is then passed through a water bath, containing a trace of sodium carbonate, ammonia, soap or the like to neutralize residual acidity, and is then blown dry or dried. The film thus treated has a substantially non-greasy feel.

While reference has been made in the above to specific embodiments of the invention, the process and products are by no means restricted thereto.

While I do not wish to commit myself to any theory regarding the cause of the results obtained by my process and the properties of the resultant product, it is my belief that the greasy "feel" of ordinary polyethylene film is due to the presence of side chains in the polymer, and that the treatment disclosed eliminates these by an oxidative process, while leaving the continuous chains intact.

Accordingly, the treatment is not strictly confined to polyethylene, but will apply likewise to other hydrocarbon resins, which gave a greasy "feel" due to the presence of side chains. The strong oxidative treatment can be accomplished with aqua regia, chlorine monoxide, chlorine dioxide, or nitrosyl chloride, aqua regia being the preferred treatment. The corresponding compounds of other halogens may also be employed.

The temperature of the treatment can be varied up to the temperatures at which the polyethylene softens, to the extent that it becomes inconvenient to handle. At low temperatures, the time required for treatment increases, but even room temperatures and lower can be employed if the time of treatment is accordingly lengthened, for example, 24 hours for treatment at 0° C. The mechanical details of applying the treatment, of removing excess agent, and of drying are well known in the art of chemical engineering.

It is thus seen that the invention is capable of wide variations, and that the invention is not to be limited excepting by the claims, in which it is my intention to cover all novelty inherent in the invention as broadly as possible in view of prior art.

Having thus disclosed my invention, I claim:

1. The process for treating polyethylene film which consists of subjecting the surface of polyethylene film to the action of a liquid mixture consisting of 20 to 40% of fuming nitric acid and 60 to 80% of commercial hydrochloric acid to form a superficially chlorinated polyethylene surface.

2. The process for treating polyethylene film which consists of immersing polyethylene film in a liquid mixture consisting of 20 to 40% of fuming nitric acid and 60 to 80% of commercial hydrochloric acid.

3. The process for treating polyethylene film which consists of immersing polyethylene film in a liquid mixture consisting essentially of 25% of concentrated nitric acid and 75% of concentrated hydrochloric acid.

References Cited in the file of this patent

UNITED STATES PATENTS

| | | |
|---|---|---|
| 2,400,720 | Staudinger et al. | May 21, 1946 |
| 2,446,536 | Hardy | Aug. 10, 1948 |
| 2,502,841 | Henderson | Apr. 4, 1950 |
| 2,668,134 | Horton | Feb. 2, 1954 |